United States Patent Office 3,407,595
Patented Oct. 29, 1968

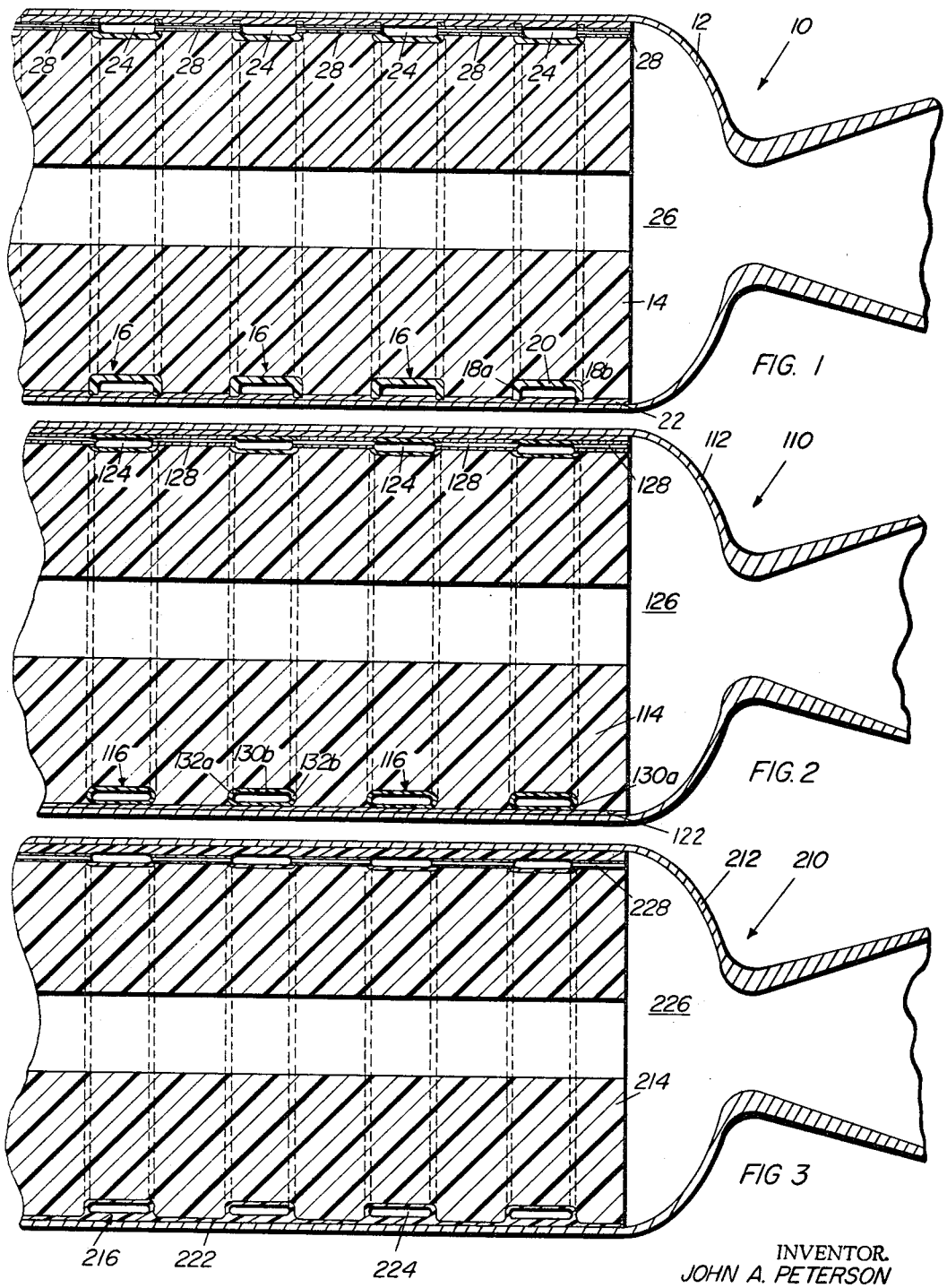

3,407,595
MEANS FOR STRESS RELIEVING CASE BONDED SOLID PROPELLANT GRAINS
John A. Peterson, Brigham City, Utah, assignor to Thiokol Chemical Corporation, Bristol, Pa., a corporation of Delaware
Filed Sept. 28, 1966, Ser. No. 582,580
3 Claims. (Cl. 60—39.47)

ABSTRACT OF THE DISCLOSURE

Means including a resilient member is disposed about a solid propellant grain which is bonded to the grain and to the motor casing. The resilient member has a portion disposed in spaced, parallel relation to the inner wall of the casing whereby stresses in the grain due to expansion and contraction thereof are relieved.

---

This invention relates to rocket motors and, more particularly, to improved means for bonding solid propellant grains to rocket motor casings.

In rocket motors wherein a solid propellant grain is bonded to a motor casing by means of a conventional "line" (i.e., a material applied to the inner surface of a motor casing to provide a bond between the casing and a solid propellant grain that is cast or inserted therein), cracks often develop at the bond between the casing and grain as a result of, for example, pressure exerted against the grain when the casing is pressurized by thrust gas, vibration of the rocket motor during its storage or operation, or contraction of the grain when it is exposed to a low temperature environment. Burning of a solid propellant grain at the surface area of a crack extending along the grain-casing interface of a rocket motor results in excessive gas generation which can cause the rocket motor to explode, and thus there has been a need for an improved arrangement for bonding such grains to rocket motor casings.

It is accordingly an object of this invention to provide improved means for bonding a solid propellant grain within a rocket motor casing.

Another object of the invention is to provide means for relieving the stress that occurs in a solid propellant grain when it is moved relative to a motor casing bonded thereto.

These and other objects are achieved by embodiments of the invention comprising at least one resilient expansion member disposed around a solid propellant grain and bonded to said grain and to the motor casing in which the grain is held, the expansion member having a portion thereof disposed in spaced, parallel relation to the wall of the motor casing.

The invention will be readily understood by consideration of the following detailed description of preferred embodiments thereof, in which reference is made to the accompanying drawings wherein:

FIGURE 1 is a sectional view taken along the longitudinal axis of a rocket motor employing one embodiment of the invention;

FIGURE 2 is a sectional view taken along the longitudinal axis of a rocket motor employing a second embodiment of the invention; and FIGURE 3 is a sectional view taken along the longitudinal axis of a rocket motor employing a third embodiment of the invention.

Throughout the following specification and the drawings, like reference numbers designate like parts.

FIGURE 1 illustrates a rocket motor 10 comprising a cylindrical motor casing 12 in which is fixedly positioned a longitudinally perforated solid propellant grain 14. Disposed between casing 12 and grain 14 and spaced apart longitudinally thereof are a plurality of expansion members 16 each of which comprises a pair of circumferentially extending side walls 18a, 18b which are spaced apart longitudinally of said casing and which project inwardly therefrom, and a middle wall 20 integrally joined to, and extending between, said side walls and spaced from said casing. The inner surface of casing 12 is coated with a bonding material or liner 22 which bonds the extremities of the side walls 18a, 18b to casing 12 and which also forms a bond between said casing and the peripheral surfaces of grain 14 extending between the longitudinally spaced expansion members 16. Grain 14 is also bonded to the peripheral surfaces (i.e., the surfaces exposed to the interior of casing 12) of expansion members 16. Liner 22 may be any of the well-known materials that are employed to bond solid propellant grains within rocket motor casings, and expansion members 16 are formed of a heat-resistant, elastomeric material of the type used to form the so-called "split-flaps" disposed around the end portions of the solid propellant grains of certain rocket motors.

Preferably the interior space 24 bounded by the middle and side walls of each expansion member 16 is communicatively connected to the combustion chamber 26 of rocket motor 10 by means of a plurality of ducts 28 which are disposed against liner 22 in the illustrated arrangement, these ducts being formed of the same type of heat-resistant, elastomeric material used to form expansion members 16. After casing 12 has been coated with liner 22, expansion members 16 and ducts 28 are installed and grain 14 is then cast within the casing by conventional techniques. If desired, liner material can be applied to the peripheral surfaces of expansion members 16 before grain 14 is cast within casing 12. However, the expansion members can also be made of a material to which the solid propellant will bond without the use of a separate bonding agent.

As pointed out hereinbefore, rocket motor 10 may be subjected to conditions that cause movement of grain 14 relative to casing 12. If force is exerted against grain 14 so as to move it to the left or right of its illustrated position in FIGURE 1, the side walls 18a, 18b of each expansion member bend to the left and right respectively, thereby relieving stress that would otherwise occur in the grain if it were bonded directly to liner 22 along its entire length. If the rocket motor is exposed to a low temperature environment which tends to cause grain 14 to shrink away from the wall of casing 12, the middle wall 20 of each expansion member 16 flexes inwardly and thus relieves the contraction stress induced in said grain. The rigidity of the bond between grain 14 and casing 12 can be controlled by varying the spacing between expansion members 16 and also by varying the width-height ratio of said expansion members (i.e., the ratio of the distance between the side walls 18a, 18b of an expansion member to the length of the side walls.) If the interiors 24 of expansion members 16 were not connected with the combustion chamber 26 of rocket motor 10, the inward movement of the middle wall 20 of each expansion member as a result of the contraction of grain 14 would cause a reduced pressure within the expansion members, which condition would tend to restrict the aforementioned inward movement of said middle wall. However, since each of the expansion members 16 is in communication with the combustion chamber 26, there is no restriction on the movement of the middle walls 20 as grain 14 contracts.

FIGURE 2 illustrates a second embodiment of the invention comprising expansion members 116 in the form of tubes which extend circumferentially of the solid propellant grain 114 of a rocket motor generally designated by the number 110. More particularly, each of the aforesaid tubes is flattened as illustrated so as to provide thereon two substantially concentric, cylindrical exterior surfaces 130a, 130b one of which is bonded to a liner 122 covering the inner surface of the casing 112 of rocket motor 110 and the other of which is bonded to grain 114. The curved end portions of expansion members 116 are also bonded to grain 114, these portions of said expansion members corresponding to the side walls 18a, 18b of the expansion members 16 of the embodiment of the invention illustrated in FIGURE 1. Liner 122 also forms a bond between casing 112 and the peripheral surfaces of grain 114 which extend between expansion members 116. A plurality of ducts 128 communicatively connect the combustion chamber 126 of rocket motor 110 with the interior 124 of each expansion member.

It will be understood from the discussion of the first-described embodiment of the invention that expansion members 116 of rocket motor 110 permit restrained movement of grain 114 without destruction of the bond between said grain and casing 112. Ducts 128 serve the same function as the ducts 28 of rocket motor 10.

The embodiment of the invention illustrated in FIGURE 3 is identical to that illustrated in FIGURE 1 except that the expansion members 216 and liner 222 thereof are formed as a unitary member (whereas in the first-described embodiment the expansion members 16 and liner 22 are separate components that are bonded together). Obviously the manner of operation of the two embodiments is the same.

While certain forms which the present invention may take have been described and illustrated, it will be apparent to those skilled in the art of solid propellant rocket motors that other embodiments, as well as modifications of those disclosed, can be made and practiced without departing from the concept of the invention. For example, a single expansion member of the same general cross-section as that of the illustrated and described expansion members 16, 116 and 216 could be helically disposed about the periphery of a solid propellant grain and bonded to said grain and the motor casing in which it is held. It is therefore to be understood that the scope of the invention is limited only by the terms of the appended claims.

What is claimed is:

1. In a rocket motor having a casing with a solid propellant grain disposed therein, the improvement comprising:
at least one expansion member comprising a pair of circumferentially extending side walls which are spaced apart longitudinally of said casing and which project inwardly therefrom, and a middle wall integrally joined to, and extending between, said side walls and spaced from said casing, said side walls being bonded to said casing and said grain being bonded to the peripheral surface of said side walls and middle wall, said expansion member being formed of an elastomeric material so as to permit movement of said grain relative to said casing without destruction of the bond therebetween, and at least one duct the opposite ends of which are respectively communicatively connected with the combustion chamber of said rocket motor and with the space between said side walls, middle wall and casing.

2. In a rocket motor having a casing with a solid propellant grain disposed therein, the improvement comprising:
a plurality of tubes disposed between said grain and said casing and extending circumferentially thereof, each of said tubes being flattened to provide thereon two substantially concentric, cylindrical, exterior surfaces one of which is bonded to said casing and the other of which is bonded to said grain, said tubes being formed of an elastomeric material so as to permit movement of said grain relative to said casing without destruction of the bond therebetween, and a plurality of ducts communicatively connecting the combustion chamber of said rocket motor with the interior of each of said tubes.

3. In a rocket motor having a casing with a solid propellant grain disposed therein, the improvement comprising:
a liner comprising a continuous layer of substantially uniform thickness disposed between said grain and said casing and a plurality of expansion members each comprising a pair of longitudinally spaced, circumferentially extending side walls integral with said layer and projecting inwardly therefrom and a middle wall inegral with, and extending between, said side walls and spaced from said layer, said grain being bonded to said liner and said expansion members formed thereon and said liner being bonded to said casing, said liner and said expansion members being formed of an elastomeric material so as to permit movement of said grain relative to said casing without destruction of the bond therebetween, and means for communicatively connecting the combustion chamber of said rocket motor with the space between said side walls, middle wall and layer at each of said expansion members.

References Cited

UNITED STATES PATENTS

| | | | |
|---|---|---|---|
| 2,733,568 | 2/1956 | Dickinson | 60—255 |
| 3,009,385 | 11/1961 | Burnside | 60—255 XR |
| 3,270,502 | 9/1966 | Silver | 60—255 |

CARLTON R. CROYLE, *Primary Examiner.*